United States Patent
Xin et al.

(10) Patent No.: US 11,770,282 B2
(45) Date of Patent: Sep. 26, 2023

(54) MODULATION SCHEME FOR LOW PEAK AVERAGE POWER RATIO (PAPR)

(71) Applicant: ZTE Corporation, Guangdong (CN)

(72) Inventors: Yu Xin, Guangdong (CN); Guanghui Yu, Guangdong (CN); Jian Hua, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/687,255

(22) Filed: Mar. 4, 2022

(65) Prior Publication Data

US 2022/0200834 A1 Jun. 23, 2022

Related U.S. Application Data

(63) Continuation of application No. PCT/CN2019/104496, filed on Sep. 5, 2019.

(51) Int. Cl.
*H04L 27/26* (2006.01)

(52) U.S. Cl.
CPC ........ *H04L 27/2615* (2013.01); *H04L 27/262* (2013.01); *H04L 27/2628* (2013.01)

(58) Field of Classification Search
CPC ............... H04L 27/2615; H04L 27/262; H04L 27/2621; H04L 27/2628; H04L 27/2636; H04L 27/26362
See application file for complete search history.

(56) References Cited

U.S. PATENT DOCUMENTS 9,544,173 B1 1/2017 Berardinelli et al.
2015/0098520 A1 4/2015 Nishikawa
(Continued)

FOREIGN PATENT DOCUMENTS

CN 103812817 A 5/2014
CN 104065610 A 9/2014
CN 106130946 A 11/2016

OTHER PUBLICATIONS

International Search Report and Written Opinion dated May 26, 2020 for International Application No. PCT/CN2019/104496, filed on Sep. 5, 2019 (6 pages).
(Continued)

*Primary Examiner* — David S Huang
(74) *Attorney, Agent, or Firm* — Perkins Coie LLP

(57) ABSTRACT

Methods, apparatus, and systems for reducing Peak Average Power Ratio (PAPR) in signal transmissions are described. In one example aspect, a wireless communication method includes determining, for a time-domain sequence x(i), an output sequence s(k). The output sequence s(k) is an inverse Fourier transform of a frequency-domain sequence S(j), and S(j) represents a dot-multiplication of a frequency-domain sequence Y(j) corresponding to the time-domain sequence x(i) and a frequency-domain sequence Z(j) corresponding to a three-coefficient function associated with $$\frac{\sqrt{2}}{2},$$

1, and $$\frac{\sqrt{2}}{2}.$$

The method also includes generating a waveform using the output sequence s(k), where i is from 0 to I−1, j is from 0 to J−1, k is from 0 to K−1, and I<J<=K.

20 Claims, 6 Drawing Sheets

(56) References Cited

U.S. PATENT DOCUMENTS

| | | |
|---|---|---|
| 2019/0052486 A1 | 2/2019 | Kuchi |
| 2020/0204421 A1* | 6/2020 | Levinbook ............ H04L 5/0007 |
| 2022/0271983 A1* | 8/2022 | Ma ...................... H04L 27/2602 |

OTHER PUBLICATIONS

European Search Report for EP Patent Application No. 19944040.5, dated Oct. 10, 2022, 9 pages.
Lanante Jr. et al., "Phase Rotation for the 80 MHz 802.11ac Mixed Mode Packet," Jul. 2010, doc.: IEEE 802.11-10/0791r2, 18 pages.
Intel Corporation, "Low PAPR Reference Signals," 3GPP TSG RAN WG1 Meeting 96bis, R1-1904316, Xi'an, China, Apr. 8-12, 2019, 13 pages.
Chinese office action issued in CN Patent Application No. 201980101856.9, dated Apr. 22, 2023, 11 pages. English translation included.

\* cited by examiner

MODULATION SCHEME FOR LOW PEAK AVERAGE POWER RATIO (PAPR)

CROSS-REFERENCE TO RELATED APPLICATIONS

This application is a continuation of International Patent Application No. PCT/CN2019/104496, filed on Sep. 5, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for reducing Peak Average Power Ratio (PAPR) in signal transmissions.

In one example aspect, a wireless communication method is disclosed. The method includes determining, for a time-domain sequence x(i), an output sequence s(k) and generating a waveform using the output sequence s(k). The output sequence s(k) is an inverse Fourier transform of a frequency-domain sequence S(j), and S(j) represents a dot-multiplication of a frequency-domain sequence Y(j) corresponding to the time-domain sequence x(i) and a frequency-domain sequence Z(j) corresponding to a three-coefficient function that is associated with $$\frac{\sqrt{2}}{2},$$

1, and $$\frac{\sqrt{2}}{2}.$$

Here, i is from 0 to I−1, j is from 0 to J−1, k is from 0 to K−1, and I<J<=K.

In another example aspect, a wireless communication method includes receiving a sequence s(k) that is generated based on a time-domain sequence x(i) and demodulating the sequence s(k) to determine the time domain sequence x(i). The sequence s(k) is an inverse Fourier transform of a frequency-domain sequence S(j), and S(j) represents a dot-multiplication of a frequency-domain sequence Y(j) corresponding to the time-domain sequence x(i) and a frequency domain sequence Z(j) corresponding to a three-coefficient function associated with $$\frac{\sqrt{2}}{2},$$

1, and $$\frac{\sqrt{2}}{2}.$$

Here, i is from 0 to I−1, j is from 0 to J−1, k is from 0 to K−1, and I<J<=K.

The following examples list techniques preferably implemented by some embodiments. In some embodiments, the frequency-domain sequence Z(j) corresponds to a time domain sequence z(j) associated with the three-coefficient function, and z(0)=1, z(1)=z(J−1)=

$$\frac{\sqrt{2}}{2},$$

and z(j)=0 for remaining values of j. In some embodiments, the frequency-domain sequence Z(j) is determined by a multi-path delay operation that comprises performing Fourier transform of multiple delayed paths using the three-coefficient function. In some embodiments, the multiple delay paths comprise delay values including −1, 0, and 1.

In some embodiments, the frequency-domain sequence Y(j) is obtained by performing a Fourier transform on the time-domain sequence y(j). The time-domain sequence y(j) is formed by inserting zero coefficients between adjacent coefficients of the sequence x(i) and the sequence x(i) is generated by mapping data bits to constellation points according to a modulation scheme. In some embodiments, the frequency-domain sequence Y(j) is obtained by repeating a frequency-domain sequence X(i) multiple times. The frequency-domain sequence X(i) generated by performing a Fourier transform on a time-domain sequence x(i) and the time-domain sequence x(i) is generated by mapping data bits to constellation points according to a modulation scheme. In some embodiments, the modulation scheme includes π/2-Binary Phase Shift Keying (BPSK).

In some embodiments, the sequence x(i) includes a data sequence, a reference sequence, or at least one zero coefficient. In some embodiments, the method further includes (1) generating a second sequence W(u) by repeating the sequence S(j) multiple times, where u=0, 1, 2, . . . , U−1 and U<=K, (2) generating a sequence V(u) by dot-multiplying the second sequence W(u) with a predefined sequence F(u), and (3) performing the inverse Fourier transform using the sequence V(u). In some embodiments, the frequency-domain sequence Z(j) is predefined.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

In high-frequency wireless communication scenarios, path loss and shadow attenuation are relatively large. Thus, the signal-to-noise ratio in some areas at the edge of the cell is low. Moreover, the efficiency of the power amplifier (PA) is relatively low at high frequencies. To improve the signal to interference and noise ratio (SINR) and also save power consumption of the User Equipment (UE), it is desirable to have the UE transmit signals at the lower Peak Average Power Ratio (PAPR).

Furthermore, terminal devices may want to greatly reduce power consumption in the case of massive Machine Type Communication (mMTC). For example, in some scenarios, it is desirable to have a long battery life (e.g., of more than ten years) to reduce the need of dispatching maintenance team to replace batteries. To improve the PA efficiency of such terminal devices, the transmitted signals should be with the lower PAPR. In particular, when a large number of user devices gain non-orthogonal access, the SINR is very low. There exists a need to use a low modulation and coding scheme (MCS) and low PAPR signal modulation to improve the transmission quality.

In the current Fifth-Generation (5G) New Radio (NR) standard, although the peak-to-average ratio of DFT-s-OFDM signals is relatively low, it is still difficult to meet low PAPR requirements of various application scenarios of B5G or 6G. This patent document describes techniques that can be implemented in various embodiments to use a modulation scheme that further reduces PAPR.

Figure 1:
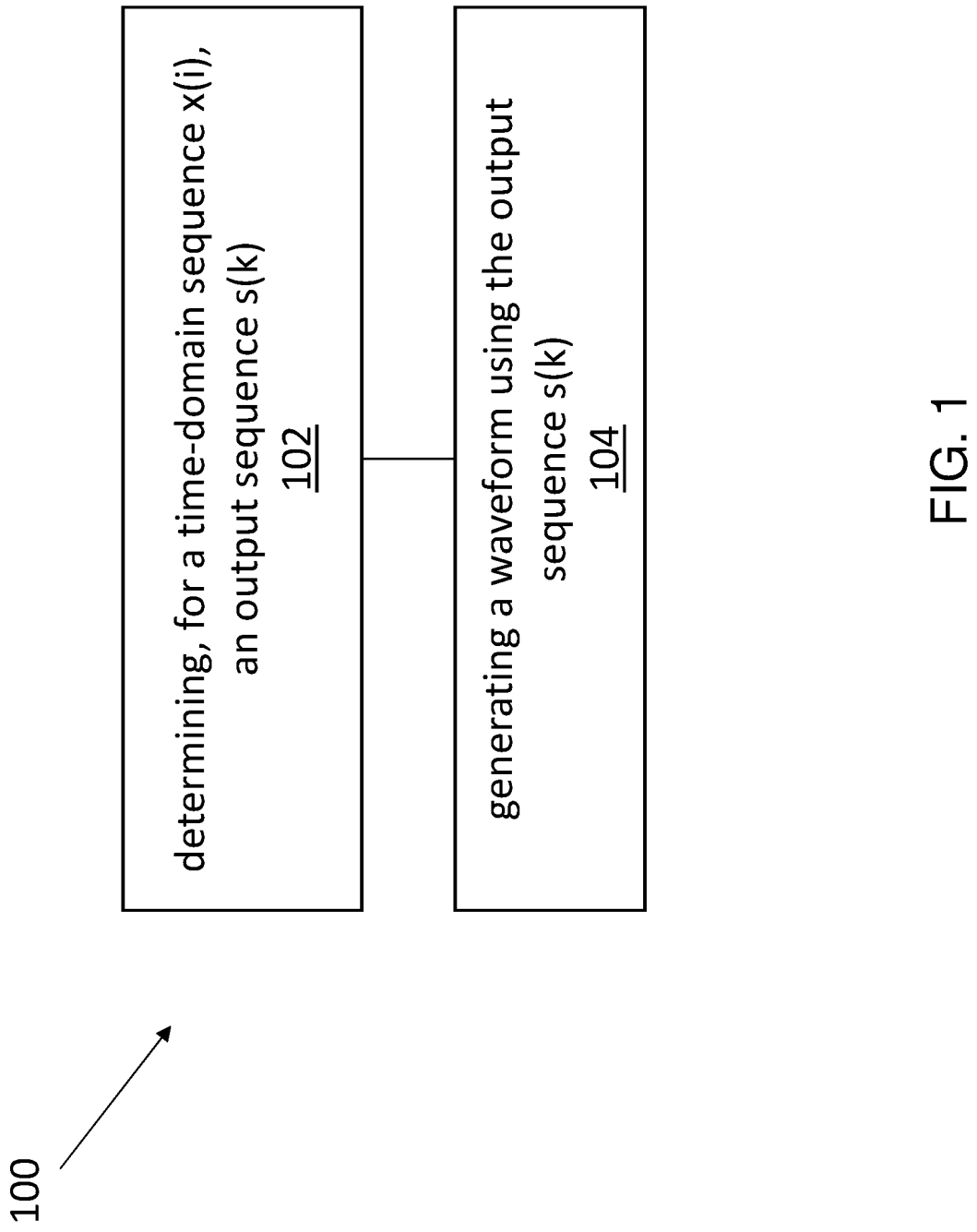
FIG. 1 is a flowchart representation of a wireless communication method in accordance with the present technology.

FIG. 1 is a flowchart representation of a wireless communication method 100 in accordance with the present technology. The method 100 includes, determining, for a time-domain sequence x(i), an output sequence s(k). The output sequence s(k) is an inverse Fourier transform of a frequency-domain sequence S(j), and S(j) represents a dot-multiplication of a frequency-domain sequence Y(j) corresponding to the time-domain sequence x(i) and a frequency-domain sequence Z(j) corresponding to a three-coefficient function. For example, the three-coefficient function can be associated with $$\frac{\sqrt{2}}{2},$$

1, and $$\frac{\sqrt{2}}{2}.$$

The method 100 also includes, at operation 104, generating a waveform using the output sequence s(k), where i is from 0 to I−1, j is from 0 to J−1, k is from 0 to K−1, and I<J<=K.

Figure 2:
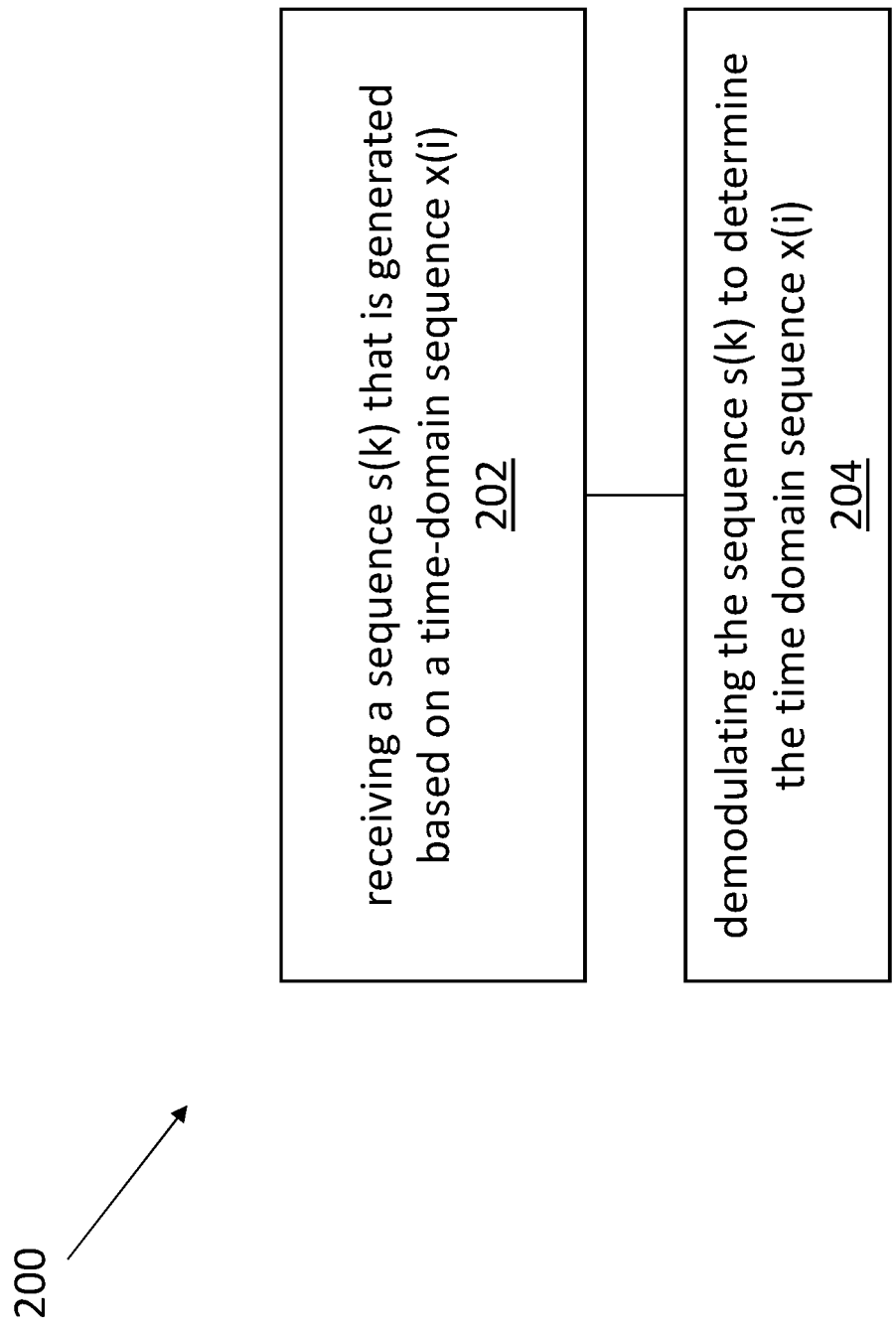
FIG. 2 is a flowchart representation of another wireless communication method in accordance with the present technology.

FIG. 2 is a flowchart representation of another wireless communication method 200 in accordance with the present technology. The method 200 includes, at operation 202, receiving a sequence s(k) that is generated based on a time-domain sequence x(i). The sequence s(k) is an inverse Fourier transform of a frequency-domain sequence S(j), and S(j) represents a dot-multiplication of a frequency-domain sequence Y(j) corresponding to the time-domain sequence x(i) and a frequency domain sequence Z(j) corresponding to a three-coefficient function. The three-coefficient function can be associated with $$\frac{\sqrt{2}}{2},$$

1, and $$\frac{\sqrt{2}}{2},$$

where i is from 0 to I−1, j is from 0 to J−1, k is from 0 to K−1, and I<J<=K. The method 200 also includes, at operation 204, demodulating the sequence s(k) to determine the time domain sequence x(i).

In some embodiments, the above described methods may preferably further include one or more of the following features. In some embodiments, the frequency-domain sequence Z(j) corresponds to a time domain sequence z(j) associated with the three-coefficient function, and z(0)=1, $$z(1) = z(J-1) = \frac{\sqrt{2}}{2},$$

and z(j)=0 for remaining values of j. In some embodiments, the frequency-domain sequence Z(j) is determined by a multi-path delay operation. The multi-path delay operation comprises performing Fourier transform of multiple delayed paths using the three-coefficient function. In some embodiments, the multiple delay paths comprise delay values including −1, 0, and 1.

In some embodiments, the frequency-domain sequence Y(j) is obtained by performing a Fourier transform on the time-domain sequence y(j). The time-domain sequence y(j) is formed by inserting zero coefficients between adjacent coefficients of the sequence x(i). The sequence x(i) is generated by mapping data bits to constellation points according to a modulation scheme. The advantage of inserting zero coefficients between coefficients of the input sequence (either before or after each element of the input sequence) is that the zero coefficients can facilitate the multipath delay operation so that the data with a path difference of two steps is not affected by the other paths. For example, given three paths $D^{-1}$, $D^0$, and $D^{-1}$, data in path $D^0$ does not impact data in path $D^{-1}$ and $D^1$. Data in path $D^{-1}$ and $D^1$ does not impact path $D^0$ either.

In some embodiments, the frequency-domain sequence Y(j) is obtained by repeating a frequency-domain sequence X(i) multiple times. For example, X(i) can be repeated to obtain Y(j), where i=0, . . . , I−1, j=0, . . . , J−1, and J=2I (that is, each element of X(i) appears twice). The frequency-domain sequence X(i) generated by performing a Fourier transform on a time-domain sequence x(i), and the time-domain sequence x(i) is generated by mapping data bits to constellation points according to a modulation scheme. The repetition in frequency domain is similar to inserting zero efficient between adjacent coefficients of the sequence x(i) in time domain. Thus, the advantage of the multiple repetitions in frequency domain is also that the data with a path difference of two steps is not affected by the other paths. For example, given three paths $D^{-1}$, $D^0$, and $D^{-1}$, data in path $D^0$ does not impact data in path $D^{-1}$ and $D^1$. Data in path $D^{-1}$ and $D^1$ does not impact path $D^0$ either.

In some embodiments, the modulation scheme can include π/2-Binary Phase Shift Keying (BPSK). Using π/2-BPSK as the modulation schemes gives the advantage that the phase between each adjacent two elements in the data sequence is π/2. In some embodiments, after the multi-path delay operation, the phase after super-positioning data paths $D^{-1}$ and $D^1$ has a difference π/4 with adjacent elements, thereby reducing the peak-to-average ratio (PAPR) of the resulting data sequence.

When the modulation scheme of π/2-BPSK is combined with frequency-domain repetition and the path coefficients, after superimposing data of paths $D^{-1}$ and $D^1$, the resulting modulus value is equal to the modulus of path $D^0$. Thus, the modulus values of all the element data of the data sequence [s(k)] are equal, and the phase difference between adjacent elements is relatively small, thereby reducing the PAPR of the data sequence [s(k)]. It is noted that while this patent document focuses on path coefficients of $$\frac{\sqrt{2}}{2},$$

1, and $$\frac{\sqrt{2}}{2},$$

other coefficients and corresponding modulation scheme that can achieve equal modulus values and small phase difference between adjacent elements can also be used to achieve low PAPR.

Moreover, after receiving the data that includes the data sequence [s(k)], the receiving end obtains the data including the data sequence [x(i)] by using a correlation detection algorithm such as maximum ratio combining, which adds minimum added complexity to the receiving side. The data sequence [x(i)] does not cause error propagation between data elements during demodulation. In addition, although the length of [s(k)] is doubled than the length of [x(i)], which requires more physical resources, the improvement of signal-to-noise ratio (SNR) (e.g., experiments have shown that SNR can be improved by 3 dB) can compensate for the loss of transmission efficiency.

In some embodiments, the sequence x(i) includes a data sequence, a reference sequence, or at least one zero coefficients. In some embodiments, the method includes generating a second sequence W(u) by repeating the sequence S(j) multiple times. For example, S(j) can be repeated R times, where R is a real number and R>=1, to obtain W(u), where u=0, 1, 2, . . . , U−1 and U<=K. The method also includes generating a sequence V(u) by dot-multiplying the second sequence W(u) with a predefined sequence F(u), and performing the inverse Fourier transform using the sequence V(u). In some embodiments, the frequency-domain sequence Z(j) is predefined.

Some examples of the disclosed techniques are described in the following example embodiments.

Embodiment 1

Frequency domain data sequence [Y(j)] includes elements [Y(0), Y(1), . . . , Y(J−1)]. A predefined frequency domain data sequence [Z(j)] includes elements [Z(0), Z(1), . . . , Z(J−1)]. After [Y(j)] is dot-multiplied by [Z(j)], the data sequence [SW] is formed as follows:

[S(j)]=[Y(0)·Z(0), Y(1)·Z(1), . . . , Y(J−1)·Z(J−1)], where "·" represents dot-product.

In some embodiments, when oversampling is not required, the data sequence [S(j)] is directly subjected to Invert Fourier Transform (IFFT) to form a data sequence [s(k)]. In this case, J=K.

In some embodiments, when oversampling is required, a plurality of zero coefficients are inserted in the data sequence [SW] to form a data sequence [S(k)], and then IFFT is performed to form a data sequence [s(k)]. In this case, J<K.

In both cases, the data sequence [s(k)] is carried on the physical time-frequency resources for transmission.

Embodiment 2

A predefined time domain data sequence [z(j)] forms a frequency domain data sequence [Z(j)] using an FFT operation, where z(0)=1, $$z(J-1) = z(1) = \frac{\sqrt{2}}{2},$$

and z(j)=0 for other j values. Data sequence [S(j)] is formed by dot-multiplying frequency domain data sequence [Y(j)] =[Y(0), Y(1), . . . , Y(J−1)] and frequency domain data sequence [Z(j)]=[Z(0), Z(1), . . . , Z(J−1)] as follows:

[S(j)]=[Y(0)·Z(0), Y(1)·Z(1), . . . , Y(J−1)·Z(J−1)], where "·" represents dot-product.

In some embodiments, when oversampling is not required, the data sequence [S(j)] is directly subjected to Invert Fourier Transform (IFFT) to form a data sequence [s(k)]. In this case, J=K.

In some embodiments, when oversampling is required, a plurality of zero coefficients are inserted in the data sequence

[S(j)] to form a data sequence [S(k)], and then IFFT is performed to form a data sequence [s(k)]. In this case, J<K.

In both cases, the data sequence [s(k)] is carried on the physical time-frequency resources for transmission.

Embodiment 3

A multi-path delay operation is defined as $$\frac{\sqrt{2}}{2}D^{-1} + D^0 + \frac{\sqrt{2}}{2}D^1.$$

Here, $D^{-1}$ corresponds to a path with a delay value of −1. $D^0$ corresponds a path of a delay value of 0 (that is, there is no delay). $D^1$ corresponds to a path of a delay value of 1. The coefficients for the three paths are $$\frac{\sqrt{2}}{2},$$

1, and $$\frac{\sqrt{2}}{2}$$

respectively. The frequency domain data sequence [Z(j)] is formed by Fourier transforms from these three delay paths.

Data sequence [S(j)] is formed by dot-multiplying frequency domain data sequence [Y(j)]=[Y(0), Y(1), . . . , Y(J−1)] and frequency domain data sequence [Z(j)]=[Z(0), Z(1), . . . , Z(J−1)] as follows:

[S(j)]=[Y(0)·Z(0), Y(1)·Z(1), . . . , Y(J−1)·Z(J−1)], where "·" represents dot-product.

In some embodiments, when oversampling is not required, the data sequence [S(j)] is directly subjected to Invert Fourier Transform (IFFT) to form a data sequence [s(k)]. In this case, J=K.

In some embodiments, when oversampling is required, a plurality of zero coefficients are inserted in the data sequence [S(j)] to form a data sequence [S(k)], and then IFFT is performed to form a data sequence [s(k)]. In this case, J<K.

In both cases, the data sequence [s(k)] is carried on the physical time-frequency resources for transmission.

Embodiment 4

Figure 3A:
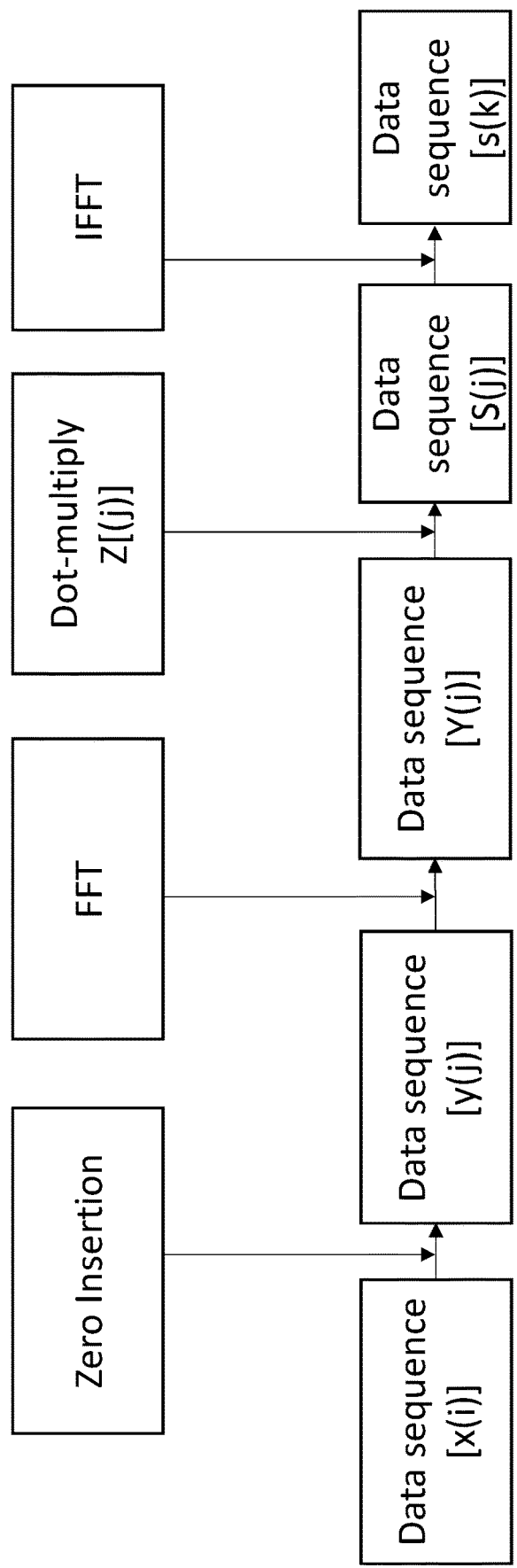
FIG. 3A illustrates an example sequence of operations in accordance with the present technology.

FIG. 3A illustrates an example sequence of operations in accordance with the present technology. The time-domain sequence x(i) can be a data sequence or a reference sequence. The sequence x(i) can also include one or more zeros and constellation modulated data. For example, a user data sequence [b(m)] that comprises 0s and 1s is first modulated by constellation points to generate a data sequence [x(i)]. The constellation modulation includes π/2-BPSK, π/4-QPSK, QPSK, 16QAM, and/or APSK. The sequence [y(j)] can be generated by inserting zero coefficients into x(i). The zero coefficients can be inserted before each coefficient of x(i). The zero coefficients can also be inserted after each coefficient of x(i).

After performing an FFT operation on the time-domain sequence [y(j)], a frequency-domain sequence [Y(j)] is generated. A dot-multiplication is then performed for [Y(j)] and [Z(j)] to generated [S(j)]. Then, an IFFT operation is performed on [S(j)] to generate data sequence [s(k)], where J<=K. Before the IFFT operation, the following steps may be performed: (1) generating a second sequence W(u) by repeating the sequence S(j) multiple times, where u=0, 1, 2, . . . , U−1 and U<=K; (2) generating a sequence V(u) by dot-multiplying the second sequence W(u) with a predefined sequence F(u), and (3) performing the inverse Fourier transform using the sequence V(u). Here, J<=U<=K.

Embodiment 5

Figure 3B:
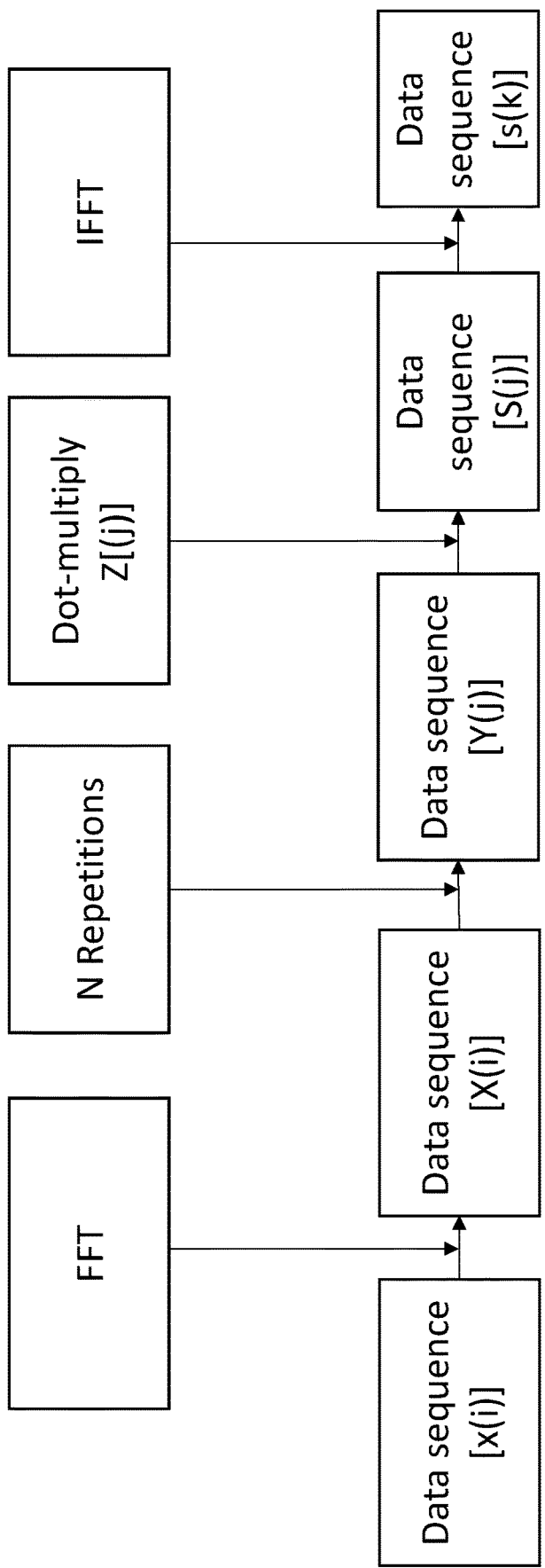
FIG. 3B illustrates another example sequence of operations in accordance with the present technology.

FIG. 3B illustrates another example sequence of operations in accordance with the present technology. The time-domain sequence x(i) can be a data sequence or a reference sequence. The sequence x(i) can also include one or more zeros and constellation modulated data. For example, a user data sequence [b(m)] that comprises 0s and 1s is first modulated by constellation points to generate a data sequence [x(i)]. The constellation modulation includes π/2-BPSK, π/4-QPSK, QPSK, 16QAM, and/or APSK. A frequency-domain sequence [X(i)] is formed by performing an FFT operation on sequence x(i).

A frequency-domain sequence [Y(j)] is then formed by repeating sequence [X(j)] multiple times, such as N times where N>=2. For example, when N=2, [X(i)]=[X(0), X(1), . . . , X(I−1)] and [Y(j)]=[X(0), X(1), . . . , X(I−1), X(0), X(1), . . . , X(I−1)].

A dot-multiplication is then performed for [Y(j)] and [Z(j)] to generated [S(j)]. Then, an IFFT operation is performed on [S(j)] to generate data sequence [s(k)], where J<=K. Before the IFFT operation, the following steps may be performed: (1) generating a second sequence W(u) by repeating the sequence S(j) multiple times, where u=0, 1, 2, . . . , U−1 and U<=K; (2) generating a sequence V(u) by dot-multiplying the second sequence W(u) with a predefined sequence F(u), and (3) performing the inverse Fourier transform using the sequence V(u). Here, J<=U<=K.

In some embodiments, other operations can be performed before the data sequence [s(k)] is carried on a physical time-frequency resource for transmission, such as adding a reference sequence in the data sequence [s(k)], adding a reference sequence before or after the data sequence [s(k)], and/or filtering of the data sequence [s(k)].

Figure 4:
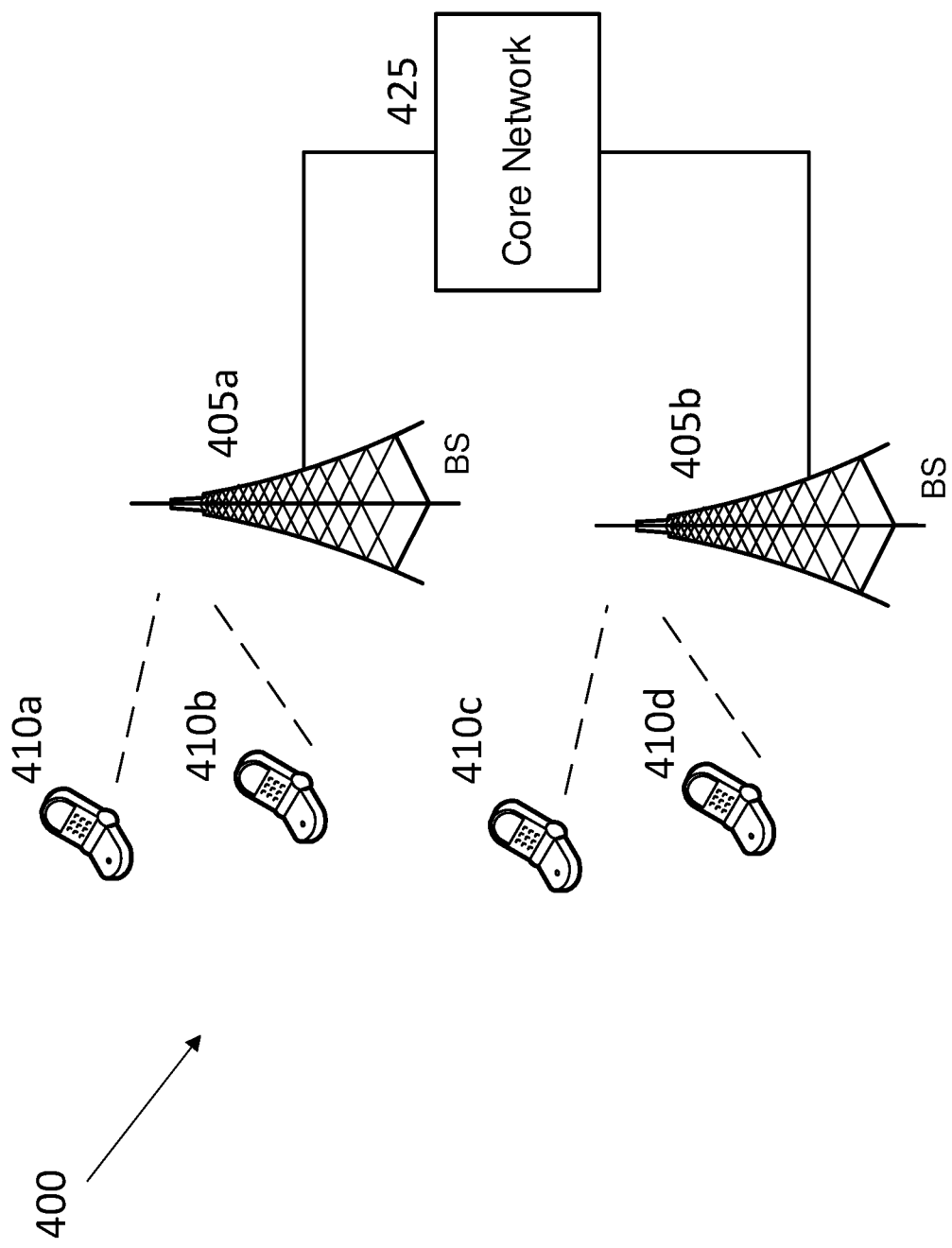
FIG. 4 shows an example of a wireless communication system where techniques in accordance with one or more embodiments of the present technology can be applied.

FIG. 4 shows an example of a wireless communication system 400 where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

Figure 5:
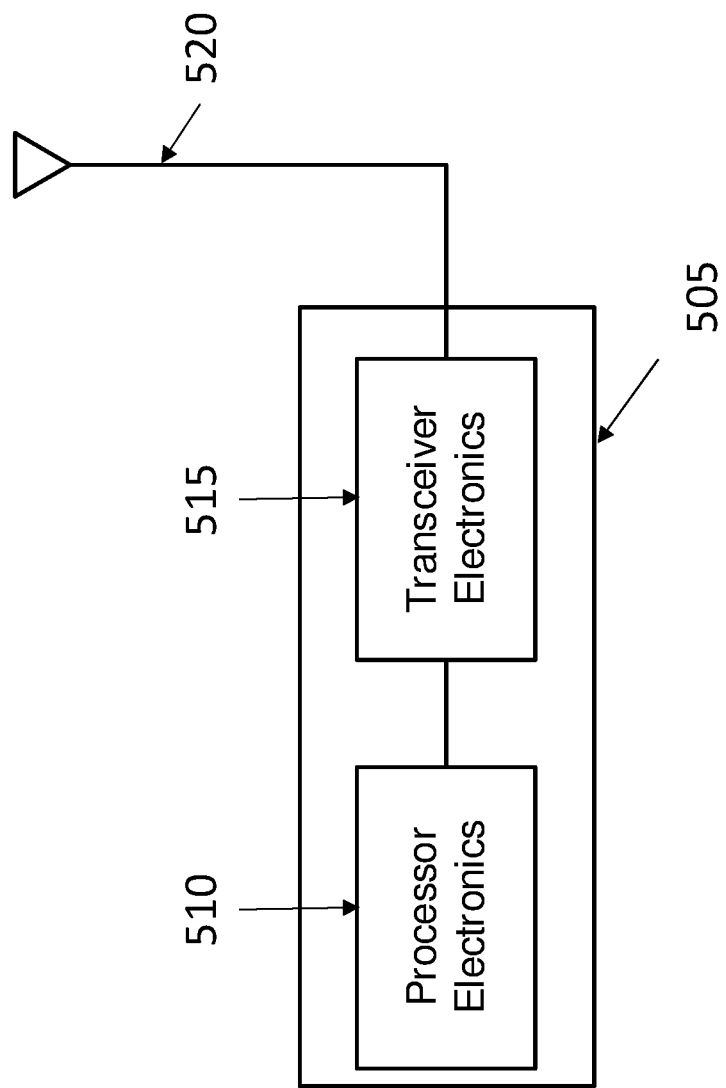
FIG. 5 is a block diagram representation of a portion of a radio station in accordance with one or more embodiments of the present technology can be applied.

FIG. 5 is a block diagram representation of a portion of a radio station in accordance with one or more embodiments of the present technology can be applied. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It will be appreciated that the present document discloses techniques that can be embodied in various embodiments to efficiently reducing PAPR in signal transmissions to meeting meet low PAPR requirements of various application scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
    determining, for a time-domain sequence x(i), an output sequence s(k), wherein the output sequence s(k) is an inverse Fourier transform of a frequency-domain sequence S(j), and wherein S(j) represents a dot-multiplication of a frequency-domain sequence Y(j) corresponding to the time-domain sequence x(i) and a frequency-domain sequence Z(j) corresponding to a three-coefficient function that is associated with $$\frac{\sqrt{2}}{2},$$

1, and $$\frac{\sqrt{2}}{2};$$

and
   generating a waveform using the output sequence s(k), wherein i is from 0 to I−1, j is from 0 to J−1, k is from 0 to K−1, and I<J<=K.

2. The method of claim 1, wherein the frequency-domain sequence Z(j) corresponds to a time domain sequence z(i) associated with the three-coefficient function, and wherein z(0)=1, $$z(1) = z(J-1) = \frac{\sqrt{2}}{2},$$

and z(j)=0 for remaining values of j.

3. The method of claim 1, wherein the frequency-domain sequence Z(j) is determined by a multi-path delay operation that comprises:
   performing a Fourier transform of multiple delay paths using the three-coefficient function, wherein the multiple delay paths comprise delay values including 1, 0, and 1.

4. The method of claim 1, wherein the frequency-domain sequence Y(j) is obtained by:
   (1) performing a Fourier transform on the time-domain sequence y(j), the time-domain sequence y(j) formed by inserting zero coefficients between adjacent coefficients of the time-domain sequence x(i), wherein the time-domain sequence x(i) is generated by mapping data bits to constellation points according to a modulation scheme; or
   (2) repeating a frequency-domain sequence X(i) multiple times, the frequency-domain sequence X(i) generated by performing a Fourier transform on a time-domain sequence x(i), wherein the time-domain sequence x(i) is generated by mapping data bits to constellation points according to a modulation scheme.

5. The method of claim 1, comprising:
   generating a second sequence W(u) by repeating the frequency-domain sequence S(j) multiple times, wherein u=0, 1, 2, . . . , U−1 and U<=K;
   generating a sequence V(u) by dot-multiplying the second sequence W(u) with a predefined sequence F(u); and
   performing the inverse Fourier transform using the sequence V(u).

6. A method for wireless communication, comprising:
   receiving a sequence s(k) that is generated based on a time-domain sequence x(i), wherein the sequence s(k) is an inverse Fourier transform of a frequency-domain sequence S(j), and wherein S(j) represents a dot-multiplication of a frequency-domain sequence Y(j) corresponding to the time-domain sequence x(i) and a frequency domain sequence Z(j) corresponding to a three-coefficient function associated with $$\frac{\sqrt{2}}{2},$$

1, and $$\frac{\sqrt{2}}{2},$$

wherein i is from 0 to I−1, j is from 0 to J−1, k is from 0 to K−1, and I<J<=K; and
   demodulating the sequence s(k) to determine the time-domain sequence x(i).

7. The method of claim 6, wherein the frequency-domain sequence Z(j) corresponds to a time-domain sequence z(j) associated with the three-coefficient function, and wherein z(0)=1, $$z(1) = z(J-1) = \frac{\sqrt{2}}{2},$$

and z(j)=0 for remaining values of j.

8. The method of claim 6, wherein the frequency-domain sequence Z(j) is determined by a multi-path delay operation that comprises:
   performing a Fourier transform of multiple delay paths using the three-coefficient function, wherein the multiple delay paths comprise delay values including −1, 0, and 1.

9. The method of claim 6, wherein the frequency-domain sequence Y(j) is obtained by:
   (1) performing a Fourier transform on a time-domain sequence y(j), the time-domain sequence y(j) formed by inserting zeros coefficients between adjacent coefficients of the time-domain sequence x(i), wherein the time domain sequence x(i) is generated by mapping data bits to constellation points according to a modulation scheme; or
   (2) repeating a frequency-domain sequence X(i) twice, the frequency-domain sequence X(i) generated by performing a Fourier transform on the time-domain sequence x(i), wherein the time-domain sequence x(i) is generated by mapping data bits to constellation points according to a modulation scheme.

10. The method of claim 6, wherein the sequence s(k) is further generated by:
   generating a second sequence W(u) by repeating the frequency-domain sequence S(j) multiple times, wherein u=0, 1, 2, . . . , U−1 and U<=K;
   generating a sequence V(u) by dot-multiplying the second sequence W(u) with a predefined sequence F(u); and
   performing the inverse Fourier transform using the sequence V(u).

11. An apparatus for wireless communication comprising a processor and a memory storing instructions, execution of which by the processor causes the apparatus to:
   determine, for a time-domain sequence x(i), an output sequence s(k), wherein the output sequence s(k) is an inverse Fourier transform of a frequency-domain sequence S(j), and wherein S(j) represents a dot-multiplication of a frequency-domain sequence Y(j) corresponding to the time-domain sequence x(i) and a frequency-domain sequence Z(j) corresponding to a three-coefficient function that is associated with $$\frac{\sqrt{2}}{2},$$

1, and $$\frac{\sqrt{2}}{2};$$

and
generate a waveform using the output sequence s(k), wherein i is from 0 to I−1, j is from 0 to J−1, k is from 0 to K−1, and I<J<=K.

12. The apparatus of claim 11, wherein the frequency-domain sequence Z(j) corresponds to a time domain sequence z(j) associated with the three-coefficient function, and wherein z(0)=1, $$z(1) = z(J-1) = \frac{\sqrt{2}}{2},$$

and z(j)=0 for remaining values of j.

13. The apparatus of claim 11, wherein the frequency-domain sequence Z(j) is determined by a multi-path delay operation that comprises:
performing a Fourier transform of multiple delay paths using the three-coefficient function, wherein the multiple delay paths comprise delay values including 1, 0, and 1.

14. The apparatus of claim 11, wherein the frequency-domain sequence Y(j) is obtained by:
(1) performing a Fourier transform on the time-domain sequence y(j), the time-domain sequence y(j) formed by inserting zero coefficients between adjacent coefficients of the time-domain sequence x(i), wherein the time-domain sequence x(i) is generated by mapping data bits to constellation points according to a modulation scheme; or
(2) repeating a frequency-domain sequence X(i) multiple times, the frequency-domain sequence X(i) generated by performing a Fourier transform on the time-domain sequence x(i), wherein the time-domain sequence x(i) is generated by mapping data bits to constellation points according to a modulation scheme.

15. The apparatus of claim 11, wherein the apparatus is further caused to:
generate a second sequence W(u) by repeating the frequency-domain sequence S(j) multiple times, wherein u=0, 1, 2, . . . , U−1 and U<=K;
generate a sequence V(u) by dot-multiplying the second sequence W(u) with a predefined sequence F(u); and
perform the inverse Fourier transform using the sequence V(u).

16. An apparatus for wireless communication comprising a processor and a memory storing instructions, execution of which by the processor causes the apparatus to:
receive a sequence s(k) that is generated based on a time-domain sequence x(i), wherein the sequence s(k) is an inverse Fourier transform of a frequency-domain sequence S(j), and wherein S(j) represents a dot-multiplication of a frequency-domain sequence Y(j) corresponding to the time-domain sequence x(i) and a frequency domain sequence Z(j) corresponding to a three-coefficient function associated with $$\frac{\sqrt{2}}{2},$$

1, and $$\frac{\sqrt{2}}{2},$$

wherein i is from 0 to I−1, j is from 0 to J−1, k is from 0 to K−1, and I<J<=K; and
demodulate the sequence s(k) to determine the time-domain sequence x(i).

17. The apparatus of claim 16, wherein the frequency-domain sequence Z(j) corresponds to a time-domain sequence z(j) associated with the three-coefficient function, and wherein z(0)=1, $$z(1) = z(J-1) = \frac{\sqrt{2}}{2},$$

and z(j)=0 for remaining values of j.

18. The apparatus of claim 16, wherein the frequency-domain sequence Z(j) is determined by a multi-path delay operation that comprises:
performing a Fourier transform of multiple delay paths using the three-coefficient function, wherein the multiple delay paths comprise delay values including −1, 0, and 1.

19. The apparatus of claim 16, wherein the frequency-domain sequence Y(j) is obtained by:
(1) performing a Fourier transform on a time-domain sequence y(j), the time-domain sequence y(j) formed by inserting zeros coefficients between adjacent coefficients of the time-domain sequence x(i), wherein the time-domain sequence x(i) is generated by mapping data bits to constellation points according to a modulation scheme; or
(2) repeating a frequency-domain sequence X(i) twice, the frequency-domain sequence X(i) generated by performing a Fourier transform on a time-domain sequence x(i), wherein the time-domain sequence x(i) is generated by mapping data bits to constellation points according to a modulation scheme.

20. The apparatus of claim 16, wherein the sequence s(k) is further generated by:
generating a second sequence W(u) by repeating the frequency-domain sequence S(j) multiple times, wherein u=0, 1, 2, . . . , U−1 and U<=K;
generating a sequence V(u) by dot-multiplying the second sequence W(u) with a predefined sequence F(u); and
performing the inverse Fourier transform using the sequence V(u).

* * * * *